United States Patent [19]

Distaffen

[11] Patent Number: 4,713,906
[45] Date of Patent: Dec. 22, 1987

[54] FISHING LURE OF THE SPOON TYPE

[76] Inventor: Patsy S. Distaffen, 278 Brayton Rd., Rochester, N.Y. 14616

[21] Appl. No.: 806,452

[22] Filed: Dec. 9, 1985

[51] Int. Cl.$^4$ ............................................. A01K 85/00
[52] U.S. Cl. ..................................................... 43/42.5
[58] Field of Search .................... 43/42.08, 42.09, 42.5

[56] References Cited

U.S. PATENT DOCUMENTS

| | | | |
|---|---|---|---|
| 2,796,693 | 6/1957 | Gunterman | 43/42.09 |
| 4,573,283 | 3/1986 | Pippert | 43/42.09 |

Primary Examiner—M. Jordan
Attorney, Agent, or Firm—Lawrence P. Kessler

[57] ABSTRACT

A fishing lure of the spoon type which exhibits effectiveness in attracting fish over a wide range of towing conditions. The spoon type lure comprises a body member having rounded leading and trailing edges. Openings are provided in the body member adjacent to the leading edge for attaching a fishing line, and adjacent to the trailing edge for attaching a fishing hook. The radius of curvature of the leading edge is less than the radius of curvature of the trailing edge. The body member has a convex portion measured from the leading edge toward the trailing edge, and a concave portion measured from the trailing edge toward the leading edge. The radius of curvature of the convex portion is substantially greater than the radius of curvature of the concave portion, and the arc length of the convex portion is greater than the arc length of the concave portion.

5 Claims, 5 Drawing Figures

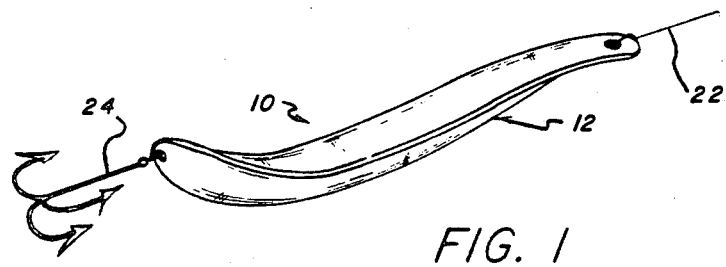
FIG. 1
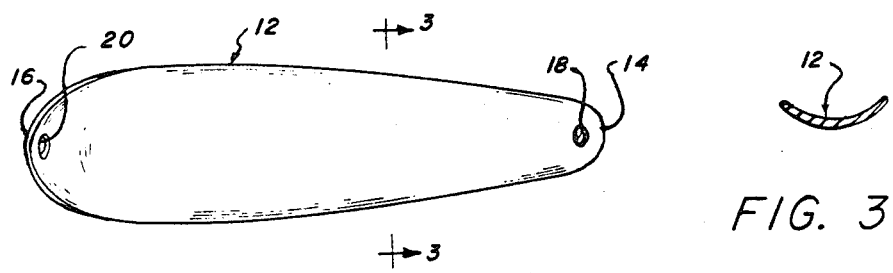
FIG. 2
FIG. 3
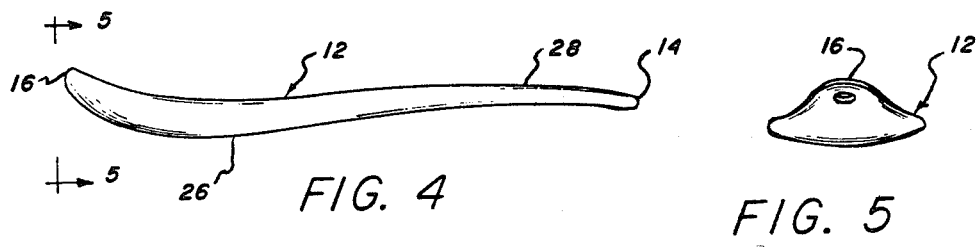
FIG. 4
FIG. 5

FISHING LURE OF THE SPOON TYPE

BACKGROUND OF THE INVENTION

This invention relates in general to fishing lures of the spoon type, and more particularly to a fishing spoon of a specific configuration which improves lure action.

In certain methods of fishing, it is common practice to employ a lure for attracting a fish to a fish hook. The lure is attached to the fishing line and the fish hook is then attached to the lure. The design of the lure is selected to be attractive to a fish as the line is towed to move the lure and the hook through the water. One type of lure is referred to as a spoon because of its spoon-like shape. The shape of the spoon causes it to move in various directions relative to the direction in which it is being towed. When the spoon incorporates a specular surface, its movement is effective for attracting fish. This is probably due to the light braking characteristics of the spoon surface as it moves through the water. However, if the towing of the spoon is not precisely controlled, the spoon will spin about its longitudinal axis and will otherwise move only in the direction in which it is being towed. It has been found that such restrictive actions markedly reduce the effectiveness of the spoon in attracting fish.

SUMMARY OF THE INVENTION

This invention is directed to a fishing lure of the spoon type which exhibits effectiveness in attracting fish over a wide range of towing conditions. The spoon type lure comprises a body member having rounded leading and trailing edges. Openings are provided in the body member adjacent to the leading edge for attaching a fishing line, and adjacent to the trailing edge for attaching a fishing hook. The radius of curvature of the leading edge is less than the radius of curvature of the trailing edge. The body member has a convex portion measured from the leading edge toward the trailing edge, and a concave portion measured from the trailing edge toward the leading edge. The radius of curvature of the convex portion is substantially greater than the radius of curvature of the concave portion, and the arc length of the convex portion is greater than the arc length of the concave portion.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 1 is a view, in perspective, of the spoon type fishing lure, according to this invention, attached to a fishing line and a fishing hook;

FIG. 2 is a top plan view of the spoon type fishing lure according to this invention;

FIG. 3 is an elevational view of the spoon type fishing lure, in cross-section, taken along the lines 3—3 of FIG. 2;

FIG. 4 is a side elevational view of the spoon type fishing lure according to this invention; an FIG. 5 is an elevational view of the spoon type fishing lure taken in the direction of lines 5—5 of FIG. 4.

DESCRIPTION OF THE PREFERRED EMBODIMENT

Referring now to the accompanying drawings, the spoon type fishing lure according to this invention is designated generally by the numeral 10. The lure 10 comprises a body member 12 formed as a blank of generally soft, metalic material such as brass or aluminum for example. The upper and lower surface areas of the body member are finished in a manner adapted to specularly reflect light. That is, such surface areas are lacqured, painted or hammered, for example. The body member 12 has a rounded leading edge 14 and a rounded trailing edge 16. The radius of curvature of the leading edge 14 is approximately equal to two-thirds the radius of curvature of the trailing edge 16. A pair of openings 18, 20, are defined in the body member 12. The opening 18 is located adjacent to the leading edge 14 and enables a fishing line 22 to be attached to the body member; and the opening 20 is located adjacent to the trailing edge 16 and enables a fishing hook 24 to be attached to the body member (see FIG. 1).

The body member 12 is configured to have, in the direction of its longitudinal axis, a concave portion 26 measured from the leading edge 14 toward the trailing edge 16, and a convex portion 28 measured from the trailing edge toward the leading edge (see FIG. 4). The radius of curvature of the convex portion 28 is approximately equal to four times the radius of curvature of the concave portion 26. Further, the arc length of the convex portion is approximately equal to 1.75 times the arc length of the concave portion. The body member 12 is also configured to have a concave cross-sectional area over that portion of the body member measured between the openings 18 and 20, along its longitudinal axis (see FIG. 3). The particularly described configuration of the body member 12 may be formed from the blank of generally soft metalic material by employing a die forming process, for example, operative on the blank of material.

A particular example of a spoon type lure 10, according to this invention, is formed from a brass blank having a thickness of approximately 1 mm, and a length of approximately 9.5 cm. The radius of curvature of the leading edge 14 is approximately 5 mm, while the radius of curvature of the trailing edge 16 is approximately 8 mm. Further, the radius of curvature of the concave portion 26, in the longitudinal direction, is approximately 2.3 cm with an arc length of approximately 3 cm from the trail edge; while the radius of curvature of the convex portion 28 is approximately 8.5 cm, in the longitudinal direction, with an arc length of approximately 5.1 cm from the lead edge. The respective arc lengths are joined by a substantially straight line tangent to the arcs.

It has been found that a spoon type lure 10 having a body member 12 configured, according to this invention, in the above described proportions is highly effective in attracting fish. The dynamics of the lure of such configuration, when moving in the water, result in the lure moving in various unpredictable directions relative to the direction in which the lure is being towed; and this movement of the lure occures regardless of the towing speed. This compares to prior lures which tend to move only in the direction in which they are towed when the towing speed is varied beyond a narrow set of limits. Of course, various unpredictable movement of a lure is much more suitable for attracting fish. Further-more, at any towing speed, the body member 12 will wobble about its longitudinal axis. That is to say, the body member will oscillate about such longitudinal axis, presenting first the front surface and then the back surface. This action is highly effective in braking the light incident on the lure surfaces, and as a result, is very efficient in attracting fish. This is in contradistinction to prior spoon type lures which tend to spin at higher towing speeds, and are less capable of braking incident light and therefore less effective in attracting fish.

The invention has been described in detail with particular reference to a preferred embodiment thereof, but it will be understood that variations and modifications can be effected within the spirit and scope of the invention.

I claim:

1. A fishing lure of the spoon type, said lure comprising:
a body member having rounded leading and trailing edges and defining openings adjacent to said leading and trailing edges respectively for attaching a fishing line and a fishing hook to said body member, said leading edge having a radius of curvature less than the radius of curvature of the trailing edge, said body member further having a convex portion measured from said leading edge toward said trailing edge and a concave portion measured from said trailing edge toward said leading edge, the radius of curvature of said convex portion being critically related to the radius of curvature of the concave portion so as to be approximately equal to four times the radius of curvature of said concave portion, whereby due to the particular shape of said body member, when said body member is towed in the water by a fishing line, said body member will move in unpredictable directions and will wobble about its longitudinal axis so as to attract fish to said hook irrespective of towing speed.

2. The invention of claim 1 wherein said radius of curvature of said leading edge is approximately equal to two-thirds of the radius of curvature of said trailing edge.

3. The invention of claim 1 wherein the arc length of said convex portion of said body member is greater than the arc length of said concave portion of said body member.

4. The invention of claim 3 wherein said arc length of said convex portion of said body member is approximately equal to 1.75 times the arc length of said concave portion of said body member.

5. The invention of claim 1 wherein the surface area of said body member has a finish adapted to specularly reflect light incident thereon.

* * * * *